H. F. CRAWFORD.
TIRE VALVE ATTACHMENT.
APPLICATION FILED MAR. 9, 1916.
1,190,866.
Patented July 11, 1916.
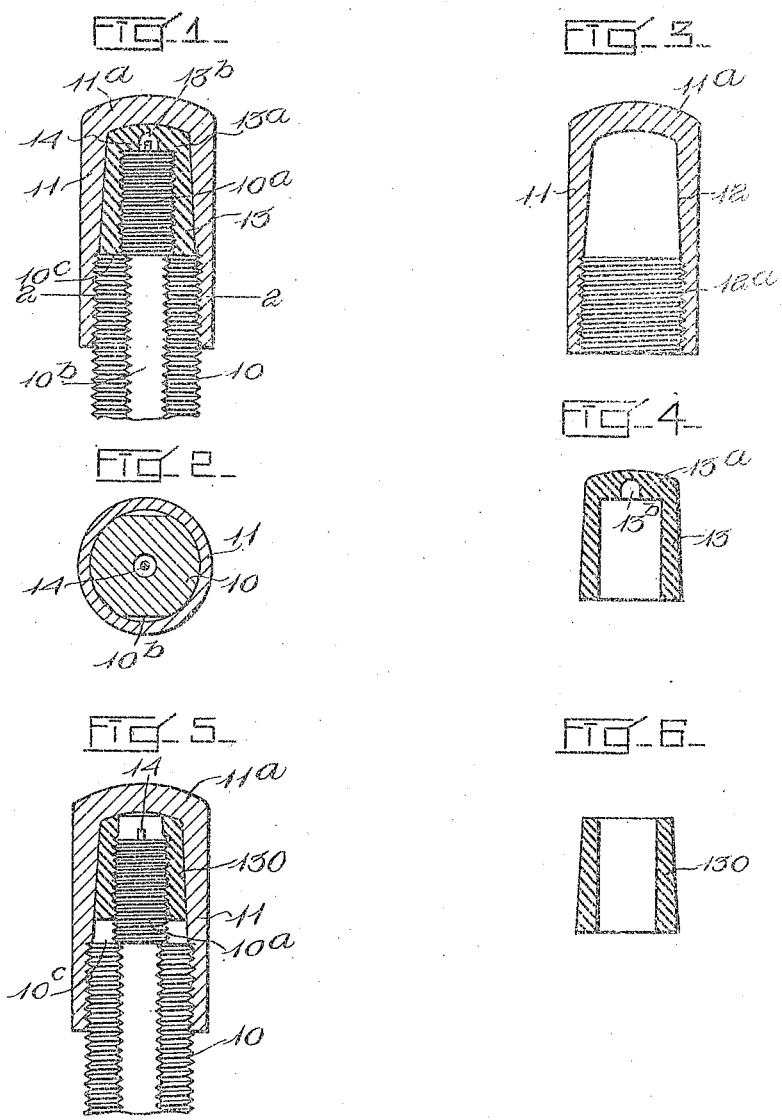
INVENTOR:
H. F. CRAWFORD
by
ATTORNEYS

UNITED STATES PATENT OFFICE.

HARVEY F. CRAWFORD, OF BROCKTON, MASSACHUSETTS.

TIRE-VALVE ATTACHMENT.

1,190,866.  Specification of Letters Patent.  Patented July 11, 1916.

Application filed March 9, 1916. Serial No. 83,064.

*To all whom it may concern:*

Be it known that I, HARVEY F. CRAWFORD, a citizen of the United States, residing at Brockton, in the county of Plymouth and State of Massachusetts, have invented new and useful Improvements in Tire-Valve Attachments, of which the following is a specification.

This invention relates to means for preventing the escape of air that may leak past the valve in the valve casing with which a pneumatic tire for vehicle wheels is provided. The valve in such casing is often made ineffective by particles of dust lodging between the valve and its seat, or by wearing of the parts, or by dirt clogging the valve mechanism. A common way of preventing the escape of air when a valve fails to prevent leakage is to provide the reduced outer end or nipple of the valve casing with a cap having in its crown a packing disk or washer of rubber or soft material adapted to be pressed upon the annular end or mouth of the nipple when the cap is screwed down. This expedient has not been found satisfactory, for, even under the most favorable conditions, little more than circular line contact between the nipple mouth and packing is afforded; and when the disk becomes worn unevenly or cut by the nipple mouth, the contact is so poor as to be practically useless for preventing the passage of air from the nipple.

The object of the present invention is to provide means more effective than those now in use for preventing escape of air from the nipple. In the attainment of this object I provide, instead of the usual rubber disk or washer, a tube of soft rubber or similar flexible or elastic material embracing the nipple, and a metal cap adapted to be screwed upon the valve body and formed internally to radially compress said tube upon the nipple and thus form an elongated sealed joint which prevents the leakage of air along the periphery of the nipple.

Of the accompanying drawings forming a part of this specification: Figure 1 represents in side elevation the outer portion or body of a tire valve casing, including the nipple, and in section a cap and a packing tube embodying my invention, applied to the nipple and body; Fig. 2 represents a section on line 2—2 of Fig. 1; Fig. 3 represents a longitudinal section of the cap; Fig. 4 represents a longitudinal section of the tube; Fig. 5 represents a view similar to Fig. 1, showing a modification; Fig. 6 represents a sectional view of the tube formed as shown by Fig. 5.

The same reference characters indicate similar parts wherever they occur.

Referring to the drawings:—10 represents the body of a valve casing, and $10^a$ the reduced outer end or nipple thereof, said nipple being preferably externally screw-threaded for the attachment of tire-inflating means. The valve body 10 is externally screw-threaded to engage a metal cap 11. The cap is closed at its outer end by a crown $11^a$, and the elongated socket formed by the interior of the cap has a tapered portion 12, and a threaded portion $12^a$ adapted to engage the external thread of the body 10. The tapered portion 12 is of gradually increasing diameter from the crown $11^a$ to the threaded portion $12^a$. The valve body 10 commonly used with automobile tires is provided with diametrically opposite faced-off or flat portions for engagement by a wrench, one such faced-off or flat portion being shown at $10^b$.

13 represents a compressible tube, preferably of soft rubber or similar material having flexibility and elasticity. Said tube is formed to embrace the nipple $10^a$ and to be radially compressed thereon by the tapered internal surface 12 of the cap when the cap is screwed to place on the body 10. The tube 13 is preferably closed at one end by a solid dome or crown $13^a$, and its tubular wall is preferably of such length that it is adapted to abut against the annular shoulder $10^c$ at the outer end of the body 10. The under portion of the crown $13^a$ has a recess $13^b$ so located as to receive the upper end of the usual valve pin or spindle 14, which, when depressed, removes the valve from its seat to deflate the tire. The provision of the recess $12^b$ avoids contact of the crown with the pin 14.

The tube 13 is preferably externally tapered, as shown by Fig. 4, and is so proportioned that when forced into the socket of the cap 11, it will be somewhat compressed by the tapering portion of said socket before the cap is screwed to place on the body 10.

After the tire has been inflated, the cap 11 containing the tube 13 is screwed onto the valve body 10, and as it travels downwardly its tapered internal portion 12 acts to radially compress the tube 13 against the periphery of the nipple 10ª, thus forming an elongated tight joint preventing the leakage of air along the periphery of the nipple. The radial compression of the tube is alone sufficient to create a tight joint, so that the tube may be open at both ends and shorter than the nipple 10ª, as shown by Figs. 5 and 6, where the tube is designated by 130.

I prefer to form the tube as shown by Figs. 1 and 4 however, the crown 13ª being pressed by the cap crown against the nipple mouth, and the inner end of the tube being pressed at the same time against the shoulder 10ᶜ, so that tight joints are formed at the mouth and base of the nipple.

The screw-thread on the nipple 10ª increases the tightness of the joint by presenting a corrugated surface that offers greater resistance to the escape of air when the tube is pressed radially against it than would a plain cylindrical surface.

Having described my invention, I claim:

1. The combination with a valve casing having an externally threaded body, a reduced nipple at its outer end, and an annular shoulder between the body and nipple, of a metal cap containing a longitudinal socket having a tapered portion and an internally threaded portion below the tapered portion to engage the external thread of the casing body, the said tapered portion surrounding the nipple and being separated therefrom by an annular tapering space, and a compressible tube embracing the nipple and radially compressed thereon by the tapering wall of the cap socket.

2. The combination with a valve casing having an externally threaded body, a reduced nipple at its outer end, and an annular shoulder between the body and nipple, of a metal cap containing a longitudinal socket having a tapered portion and an internally threaded portion below the tapered portion to engage the external thread of the casing body, the said tapered portion surrounding the nipple and being separated therefrom by an annular tapering space, and a compressible tube embracing the nipple, radially compressed thereon and seated on said shoulder by the tapering wall of the cap socket.

3. The combination with a valve casing having an externally threaded body, a reduced nipple at its outer end, and an annular shoulder between the body and nipple, of a metal cap containing a longitudinal socket which is internally threaded at its lower portion to engage the external thread of the casing body, and a compressible tube embracing the nipple and having a crown at its outer end compressed upon the mouth of the nipple, the tube being of greater length than the nipple, so that its open end is compressed upon said shoulder.

4. The combination with a valve casing having an externally threaded body, a reduced nipple at its outer end, and an annular shoulder between the body and nipple; of a rigid cap containing a longitudinal socket having a tapered portion and an internally threaded portion below the tapered portion to engage the external thread of the casing body, and a compressible member embracing the nipple, said compressible member having tapering walls increasing in thickness as they extend toward said annular shoulder.

In testimony whereof I have affixed my signature.

HARVEY F. CRAWFORD.